Sept. 29, 1970    G. SIEBERS ET AL    3,530,668
RAPID GEAR-CHANGE APPARATUS
Filed March 25, 1969
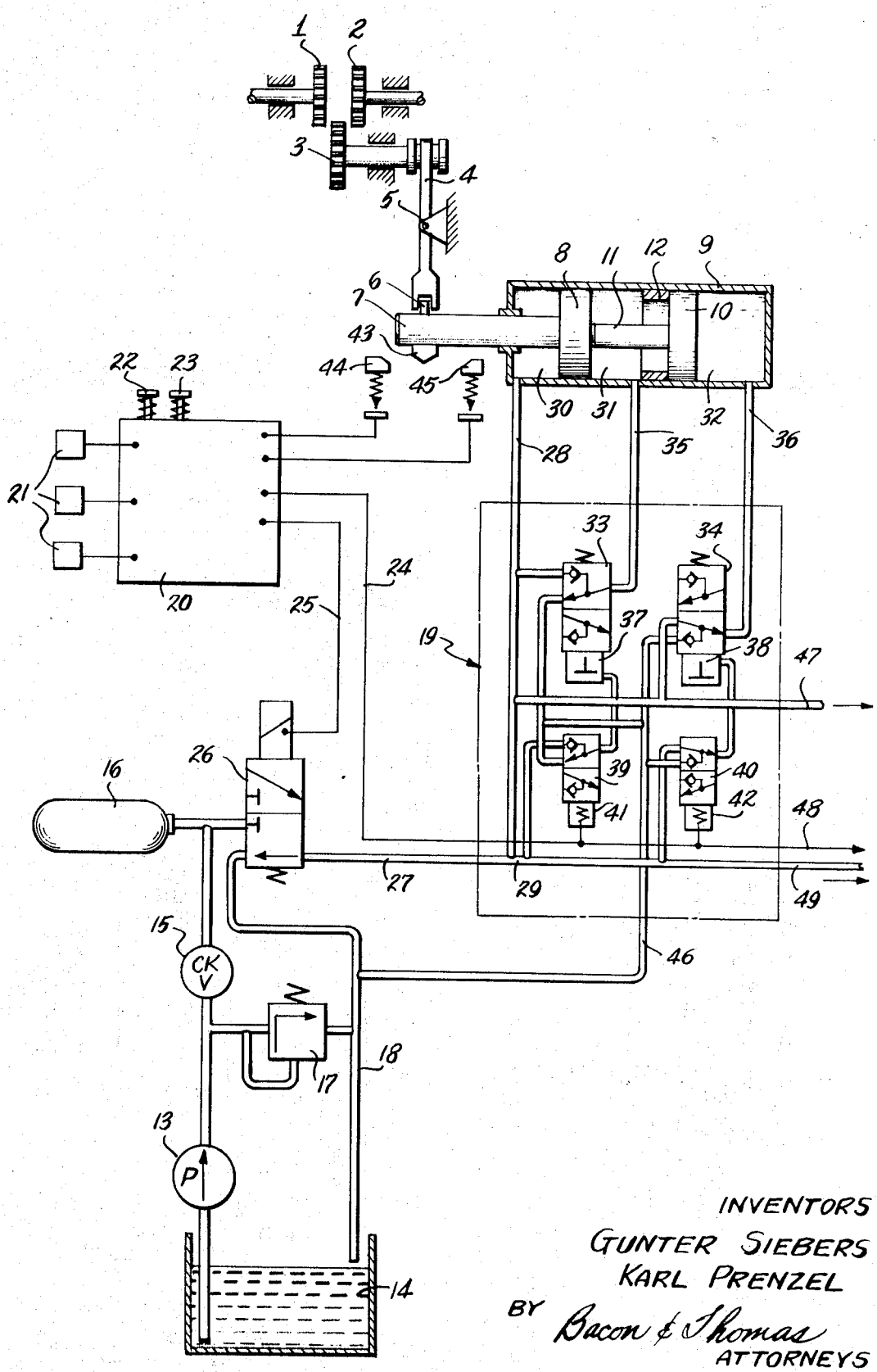
INVENTORS
GUNTER SIEBERS
KARL PRENZEL
BY Bacon & Thomas
ATTORNEYS

United States Patent Office

3,530,668
Patented Sept. 29, 1970

3,530,668
RAPID GEAR-CHANGE APPARATUS
Gunter Siebers, Dahlmannstrasse 32, Nuremberg, Germany, and Karl Prenzel, Chemnitzerstrasse 27a, Neu-Katzwang, Germany
Filed Mar. 25, 1969, Ser. No. 810,311
Claims priority, application Germany, Mar. 30, 1968,
1,750,114
Int. Cl. F15b 9/09; F16h 5/60; G05g 19/00
U.S. Cl. 60—51
4 Claims

ABSTRACT OF THE DISCLOSURE

The invention relates to a hydraulic gear change apparatus for toothed change-speed gearing. It comprises substantially an engine-driven hydraulic pump, at least one hydraulic actuating motor for performing the gear-changing movements, and an electrically operated control member between the pump and the actuating motor. The control member is associated with an electric or electronic command unit which gives the gear-change commands. As such, it can take various forms and does not form part of the present invention.

BACKGROUND OF THE INVENTION

Electronic command units respond, for example, in the motor vehicle field to the driving state of a vehicle in accordance with several parameters which represent various driving conditions of components of the vehicle, such as the accelerator pedal position, engine speed and road speed and at predetermined relative values of these driving conditions the unit gives a gear-change instruction to the control member of the gear-changing apparatus, which latter then performs the gear-changing process. In these circumstances it is necessary for this gear-changing process to be carried out in as short a time as possible following receipt of the instruction. If this is not the case, the output values from the electronic equipment and thus the driving condition of the vehicle could have altered substantially in the meantime, to such an extent that the gear-changing process cannot be performed under the contemplated conditions. Such a delay, if it is the same for all gear ratios, could be allowed for by the command unit, but this involves additional expense.

It is, therefore, the aim of the present invention to provide gear-changing apparatus of the kind mentioned above, which requires only a minimum of time for carrying out the instructed gear-change.

The single figure of the drawing shows the hydraulic actuating cylinder of the gear-change apparatus and a block circuit diagram of the hydraulic circuit as an example for a gear having two speeds.

The change-speed gearing symbolized by the gear wheels 1, 2 and 3 is actuated by the fork 4. This is capable of pivoting about the point 5 and is moved by a nose 6 on the piston rod 7 of the working piston 8. The latter is a component of the hydraulic actuating cylinder 9. This also contains inside it the auxiliary piston 10 with its piston rod 11 and the stop 12.

The hydraulic circuit is supplied by the pump 13. It draws hydraulic oil from the reservoir 14 and forces it through the non-return valve 15 into an oil pressure accumulator 16 of any desired kind. When the accumulator 16 is full, surplus hydraulic oil is returned through the pressure-relief valve 17 and the pipe 18 to the reservoir 14.

The electric control member 19 which is described further below, receives the gear-change instruction from the command unit 20. This in its turn is controlled by a number of transducers 21. These could, for example, in a motor vehicle give the engine speed, the accelerator pedal position and the road speed. The command unit 20 can, however, also be operated by hand through the buttons 22 and 23. The command unit 20 is built up of a number of electronic building blocks such as threshold switches, flip-flop states, logic gates, etc., selected according to the required relationships. Such command units are already known in principle.

The command unit 20 is connected to the control member 19 through an electric connection 24. A further electric connection 25 extends between the magnetic valve 26 and the command unit. The connection 25 is not absolutely essential. It can be omitted where an alternative method of operation is chosen for the hydraulic circuit.

The magnetic valve 26 is between the oil pressure accumulator 16 and the pressure pipe 27 which is divided into an actuating connection 28 and a pipe 29 for a hydraulic auxiliary circuit.

In the embodiment chosen by way of example the actuating connection 28 is connected directly through the pipe 29 to the left-hand end 30 of the actuating cylinder 9. The hydraulically operated valves 33 and 34 are interposed through the pipes 35 and 36 for the pressure spaces 31 and 32. The valves 33 and 34 are made of large volume and are provided for the passage of that hydraulic oil which performs the gear-changing movement. As indicated by the symbols 37 and 38 on their operating pistons, they are actuated by means of pressure fluid. This in its turn is controlled by magnetic valves 39 and 40. Their coils 41 and 42 are energized by the command unit 20.

A switching cam 43 is mounted on the piston 7. In the end positions this operates contacts 44 and 45. They indicate the end positions of the piston 8 and thus of the fork 4 to the command unit 20. At 46 there is indicated a connection for the hydraulic oil to the reservoir 14. The pipes 47 and 49 and connection 48 serve for the connection of further control members which are constructed exactly like the control member 19.

The drawing illustrates the system in the rest condition. Its manner of operation is as follows:

As indicated by the lower connecting symbol on the valve 26, in the rest condition the connection between the accumulator 16 and the pressure pipe 27 is interrupted. As further indicated by the upper symbol on the valve 33 and the lower symbol on the valve 34, and by the lower symbol on the valve 26 and the remaining hydraulic connections, all the hydraulic units are connected to the reservoir 14. The pressure in the system can thus vanish in the rest condition and the oil remains without pressure in the pipes and the units.

In the present embodiment the command unit issues the preliminary command "prepare for change" to the magnetic valve 26 via the connection 25 before the actual gear-changing instruction. This brings its upper symbol into action. By this means the connection 27 is exposed to the pressure in the accumulator 16. As indicated by the pipes 28 and 36 and the valve 34, both spaces 30 and 32 are under hydraulic pressure in this condition of readiness to change. In this way the auxiliary piston 10 of the actuating cylinder 9 is urged to the left up against the stop 12 and simultaneously the working piston 8 is urged to abut against the rod 11 which limits its travel. The working piston 8 and thereby the position of the nose 6 are accordingly centralized hydraulically into the middle position. This information is transmitted to the command unit 20 by the fact that the contacts 44 and 45 are now open and in the command unit an electronic output lock in the connection 24 is opened.

If now, for example, the working piston 8 is to be moved to the left for a gear-changing operation, the winding 41 receives the gear-changing instruction from the command unit through the connection 24. The magnetic valve 39 responds and opens the hydraulic connection between the control pipe 29 and the operating piston 37 of the valve 33. Through this valve the pipe 35 is now connected to the pipe 28 so that now the space 31 in the cylinder 9 is also exposed to hydraulic pressure. As the effective surface area on the right hand side of the working piston 8 is larger than that on the left hand side the piston 8 is displaced to the left and the gear-changing process in the gearing 1 to 3 is performed by means of the components 6 and 4. Simultaneously this causes the contact 44 to close and the completion of the gear-changing operation is signalled to the command unit and the further above-mentioned outlet lock in the command unit 20 for the connection 24 is closed and thereby a further mechanical gear-changing operation is prevented as long as the preceding one is still in action. Simultaneously the magnetic valve 26 is deenergized and the overall hydraulic system connected to the pipe 27 is accordingly again depressurized.

The return of the gearing 1, 2 and 3 to its neutral position occurs as explained further above by the hydraulic centralizing of the working piston 8 on receipt of the preliminary command "prepare for change."

If the working piston 8 is now to be displaced to the right from this middle position or position of readiness, the winding 42 of the magnetic valve is now energized by the instruction received through the connection 24. The magnetic valve 40 allows hydraulic fluid to pass to the upper face of the operating piston 38 of the valve 34. Its upper symbol comes into action and a connection is formed between the pressure space 32 and the reservoir 14 through the pipes 36 and 46. The pressure in the space 32 which was present during the condition of readiness for change can vanish and the pressure which is always present in the space 30 can displace the working piston 8 together with the auxiliary piston 10 to the right.

As will be seen, the control member 19 is made up of pairs of valves, namely, for each direction of movement a small-volume magnetic valve 39 or 40 and a large-volume hydraulically actuated valve 33 or 34 controlled by it, the latter valve doing the actual controlling for the gear-changing process. The magnetic valves can accordingly be chosen to be extremely small. Their correspondingly small windings therefore only have small inductance. Also, only a corresponding minimum time is necessary for the build-up of the magnetic fields.

Because they are hydraulically operated the movement of the subsequent large-volume valves 33 and 34 occurs in a relatively negligible time. By the combination, according to the invention, of a small-volume magnetic valve and an associated large-volume hydraulically operated valve there is obtained accordingly the minimum possible time delay for carrying out the gear-changing process and for example there is an actual operating time of 35 milliseconds from receipt of the gear-change instruction up to the completion of the travel of piston 8. If on the other hand one were to construct the large-volume valves 33 and 34 themselves as magnetic valves, then these would, as a consequence of the large volume flow through them, have to have correspondingly large operating solenoids with corresponding high-inductance windings. However, this would delay the build-up of the magnetic fields as compared with the arrangement according to the invention and it would not be possible to get below a four-fold or five-fold increase in the operating time.

A further reduction in the actual operating time is obtained if, according to a preferred feature of the invention, at least the magnetic valves 39 and 40 are chosen to be ball-valves. In Normal valves with central rotationally symmetrical control slides and annular pressure spaces arranged around them, positive overlap of the pressure spaces by the control members is necessary in order to keep the leakage down as low as possible. On each operation the length of this overlap must accordingly first be overcome before the control member actually provides a flow path. This requires additional time and because of the longer stroke the solenoid of the valve must be correspondingly powerful and must be constructed with a correspondingly higher winding inductance. Ball valves have on the other hand no positive overlap of the closure member and accordingly they have a shorter operative stroke. Their solenoids can accordingly be smaller and constructed with a lower winding inductance than the above-mentioned slide valves. Thus, a correspondingly shorter switching time is obtained.

The accumulator 16 can be omitted if a sufficiently powerful large-volume pump 13 is employed. In order to be able to use a small one and in order also to have hydraulic pressure available when the pump is stationary, the oil pressure accumulator 16 is present in the preferred embodiment.

As will be evident from the foregoing description, the magnetic valve 26 is provided in the hydraulic circuit. As described this offers the possibility of relieving the pressure of the hydraulic system in the rest condition, i.e. both in the neutral central position and also in each of the end positions of the working piston 8. The piston 8 is accordingly free to make small movements on completion of the gear-changing operation, which movements may be transmitted to the nose 6 by the gearing through the usual catch on the fork 4. In this way any possible danger of wear is opposed. However, without difficulty one could envisage that with the usual knowledge of hydraulics a residual pressure could be provided in the hydraulic system in the rest condition, in a manner analogous to the well-known provision of a quiescent current in the circuit of electrical systems.

The gear-changing apparatus according to the invention finds particularly favorable employment in gearing installations in which a synchronous condition of the gearing members to be engaged is detected electrically and the signal is fed to the command unit 20. On passing through the condition of synchronism the command unit gives the gear-change instruction and the gear-changing apparatus must then bring the components of the gearing together within the shortest possible time, i.e. within a very close range of synchronism. It will be evident that the actual gear-changing operation can occur in a more friction-free manner and simpler from the control aspect, the shorter is the time between receipt of the gear-change instruction and completion of the gear-changing operation. If the changing operation is sufficiently short, it indeed becomes unnecessary to de-clutch the drive for the operation.

We claim:

1. Hydraulic gear-changing apparatus for toothed change-speed gearing comprising an engine-driven hydraulic pump, a hydraulic actuating motor, a control member consisting of a pressure-fluid-operated valve of large flow volume for directing pressure fluid to the actuating motor, a magnetically operated valve of small volume for an auxiliary hydraulic circuit for actuating said control member, and an electric command unit for actuating said auxiliary hydraulic circuit.

2. Control apparatus according to claim 1, characterized in that at least said magnetically operated valve is a ball valve.

3. Control apparatus according to claim 1, characterized in that a pressure connection between the hydraulic pump and the said valves incorporates an oil pressure accumulator.

4. Gear-change apparatus according to claim 1, characterized in that an electrically controlled multi-way valve is connected in a pressure pipe between the pump and the control valves, the energizing coil of this multi-way valve being connected to the command unit and this valve, when in one position, allowing the flow of oil to the control valves and in its other position depressurizing the hydraulic circuit of the latter.

References Cited

UNITED STATES PATENTS

| 2,839,944 | 6/1958 | Rucker | 74—866 |
| 2,995,949 | 8/1961 | Gelenius et al. | 74—866 |
| 3,200,590 | 8/1965 | Summerlin | 60—51 |
| 3,208,220 | 9/1965 | Lechat | 60—51 |
| 3,359,725 | 12/1967 | Maier | 60—51 |
| 3,448,640 | 6/1969 | Nelson | 74—866 |

ARTHUR T. McKEON, Primary Examiner

U.S. Cl. X.R.

74—336, 866